US008154765B2

(12) United States Patent
Purdum et al.

(10) Patent No.: US 8,154,765 B2
(45) Date of Patent: Apr. 10, 2012

(54) METHODS AND ALGORITHMS FOR ADJUSTING GLOSS LEVELS IN PRINTERS

(75) Inventors: Connie Purdum, Rochester, NY (US); Lalit Keshay Mestha, Fairport, NY (US); Martin Maltz, Rochester, NY (US); Frederick J. Ramsey, Webster, NY (US); Alvaro Enrique Gil, Rochester, NY (US)

(73) Assignee: Xerox Corpoartion, Norwalk, CT (US)

( * ) Notice: Subject to any disclaimer, the term of this patent is extended or adjusted under 35 U.S.C. 154(b) by 575 days.

(21) Appl. No.: 12/421,745

(22) Filed: Apr. 10, 2009

(65) Prior Publication Data

US 2010/0259794 A1    Oct. 14, 2010

(51) Int. Cl.
*H04N 1/60* (2006.01)
*G03G 21/00* (2006.01)
(52) U.S. Cl. ........ 358/1.9; 358/3.24; 358/518; 358/300; 399/81
(58) Field of Classification Search .................... 358/1.9, 358/2.1, 3.24, 3.26, 3.27, 518–523, 530, 358/300; 399/81
See application file for complete search history.

(56) References Cited

U.S. PATENT DOCUMENTS

| 6,639,669 | B2 | 10/2003 | Hubble, III et al. |
| 2004/0004731 | A1* | 1/2004 | Itagaki ............................ 358/1.9 |
| 2010/0290797 | A1* | 11/2010 | Mestha et al. .................. 399/38 |
| 2011/0019212 | A1* | 1/2011 | Wang et al. .................... 358/1.9 |

OTHER PUBLICATIONS

Mestha et al., "Advances towards high quality color profiling", 2nd Annual XIG Conference, May 13-15, 2008, Xerox Corporation, Webster, NY, 7 pages.
Dalal et al., "The Effect of Gloss on Color", Color research and application., vol. 24, No. 5, Oct. 1999, pp. 369-376.

* cited by examiner

*Primary Examiner* — Scott A Rogers
(74) *Attorney, Agent, or Firm* — Pillsbury Winthrop Shaw Pittman LLP

(57) ABSTRACT

A printer configured to adjust gloss appearance of images includes a marking engine configured to render an image on a substrate from input image data; and a controller configured to: (i) correlate a minimum luminance value to be used by the printer based on a gloss selection; (ii) determine a black point compensation function based on the correlated minimum luminance value; and (iii) adjust luminance values for input image data using the determined black point compensation function. A method to adjust gloss appearance of images is also provided.

27 Claims, 8 Drawing Sheets

METHODS AND ALGORITHMS FOR ADJUSTING GLOSS LEVELS IN PRINTERS

FIELD

This application generally relates to printing, and in particular, adjusting gloss levels in printers.

BACKGROUND

Digital production color printers, such as the Xerox Corp. DocuColor™ 5000 and 8000 Digital Presses, may show excessive gloss levels in color prints particularly when images with dark shadow colors are printed.

Advanced destination profiles typically provided in the printer contain a Gray Component Replacement (GCR) module which sets the amount of CMYK separations to be used appropriately. Particularly for dark colors, adjusting or modifying GCR is one way to reduce the gloss level. This process, however, can be difficult and complex since modifying GCR may induce contours depending on the way GCRs are designed.

Another way for reducing gloss levels is by introducing low gloss toners and improvement to the fusing subsystems. This approach is extremely complex and may also be very expensive. As such, customer expectations for gloss have not always been completely fulfilled.

SUMMARY

According to an embodiment, a method for adjusting gloss appearance of images using a printer, comprises: receiving a gloss selection input; correlating the input gloss selection to a minimum luminance value to be used by the printer; determining a black point compensation function based on the correlated minimum luminance value; adjusting luminance values for input image data using the determined black point compensation function; and rendering an image on a substrate based on the adjusted luminance levels.

According to another embodiment, a printer configured to adjust gloss appearance of images comprises: a marking engine configured to render an image on a substrate from input image data; and a controller configured to: (i) correlate a minimum luminance value to be used by the printer based on a gloss selection; (ii) determine a black point compensation function based on the correlated minimum luminance value; and (iii) adjust luminance values for input image data using the determined black point compensation function.

Other features of one or more embodiments of this disclosure will seem apparent from the following detailed description, and accompanying drawings, and the appended claims.

BRIEF DESCRIPTION OF THE DRAWINGS

Embodiments of the present disclosure will now be disclosed, by way of example only, with reference to the accompanying schematic drawings in which corresponding reference symbols indicate corresponding parts, in which.

DETAILED DESCRIPTION

Figure 1:
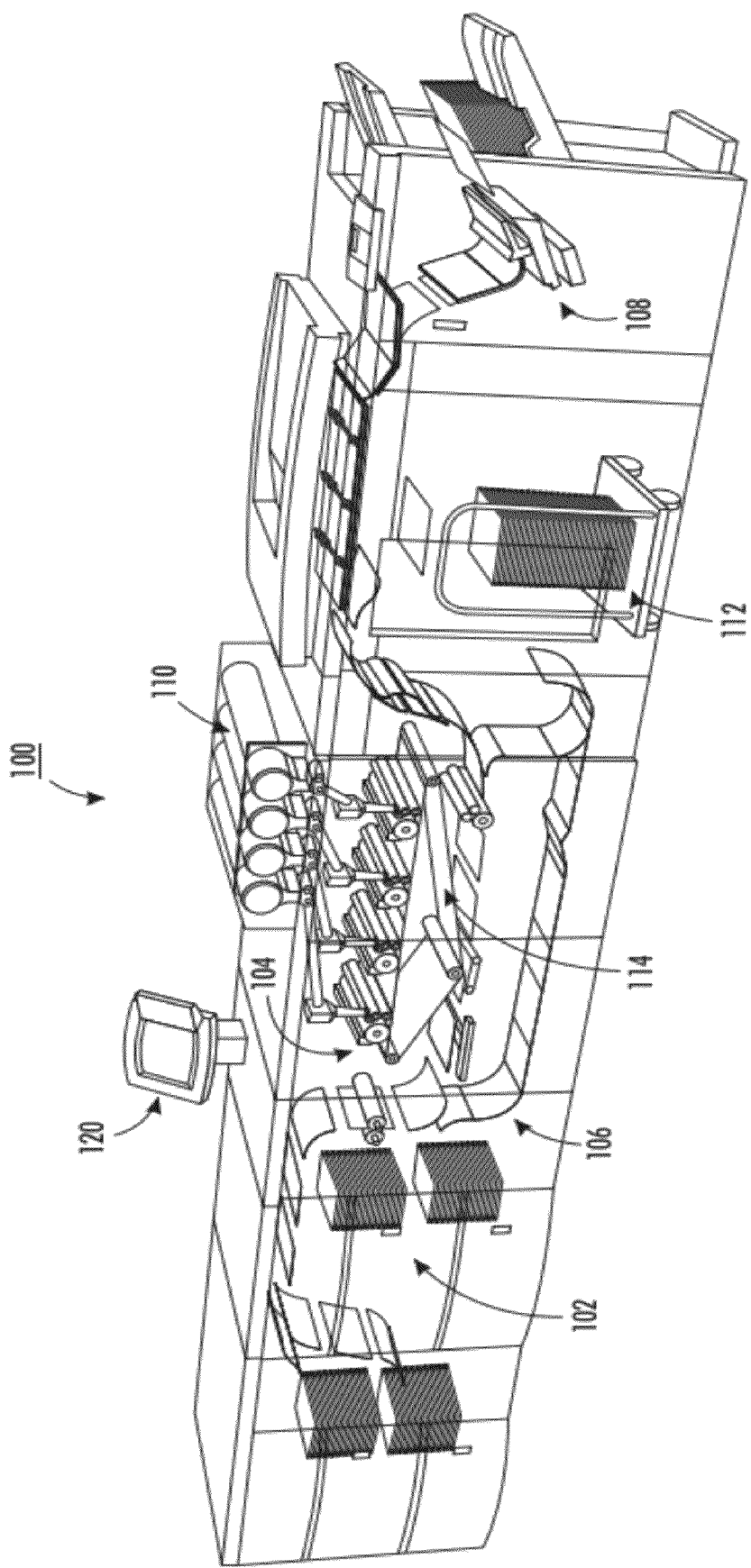
FIG. 1 shows a printer in accordance with an embodiment.

FIG. 1 shows a schematic illustration of a printer 100, in accordance with an embodiment. The printer 100 generally includes one or more sources 102 of printable substrate media that are operatively connected to a printing engine 104, and output path 106 and finisher 108. As illustrated, the print engine 104 may be a multi-color engine having a plurality of imaging/development subsystems 110 that are suitable for producing individual color images. A stacker device 112 may also be provided as known in the art.

The print engine 104 may mark xerographically; however, it will be appreciated that other marking technologies may be used, for example by ink-jet marking, ionographically marking or the like. In one implementation, the printer 100 may be a Xerox Corp. DC8000 Digital Press. For example, the print engine 104 may render toner images of input image data on a belt 114, where the belt 114 then transfers the images to the substrate.

A display device 120 may be provided to enable the user to control various aspect of the printing system 100, in accordance with the embodiments disclosed therein. The display device 120 may include a cathode ray tube (CRT), liquid crystal display (LCD), plasma, or other display device.

Figure 2:
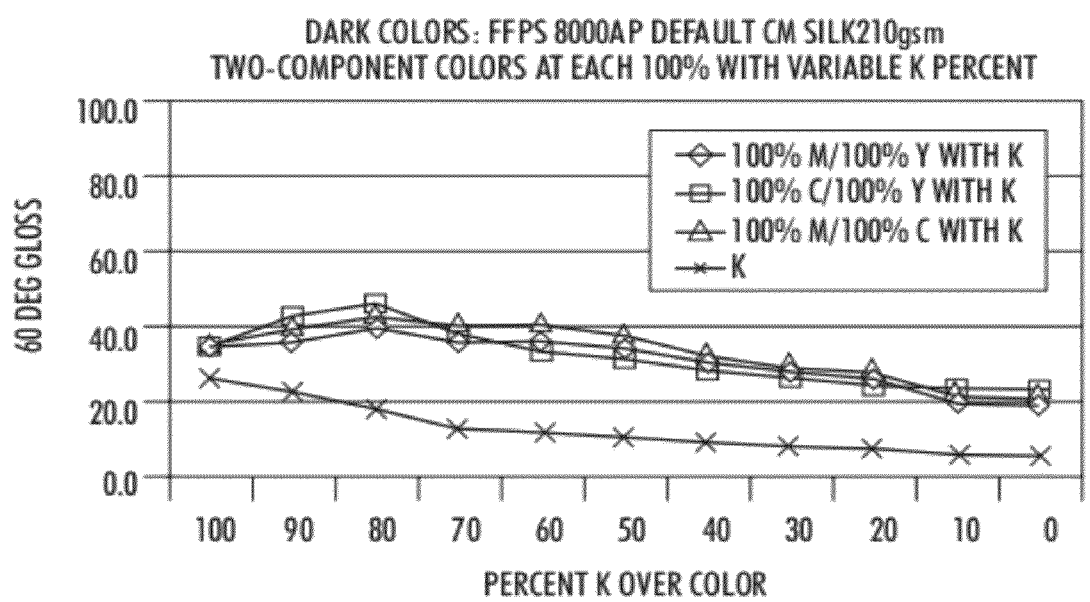
FIG. 2 shows gloss variation with respect to toner area coverage in black (K) and when black toner is mixed with other CMY toner separations.

FIG. 2 shows the gloss levels for various test patches that were printed on Silk 210 grams per square meter (gsm) paper using a conventional Xerox Corp. DC8000 Digital Press. Gloss measurements were taken at a 60 degree geometry. The plots show gloss levels for black (K) toner patches and black (K) toner printed on top of magenta-yellow (MY), cyan-yellow (CY) and magenta-cyan (MC) toner patches. Each of the patches, cyan (C), magenta (M), and/or yellow (Y) remained at 100% toner area coverage, while the toner area coverage of black (K) toner was varied. As the plots show, the greater the mass of the toner, and in particular black toner, the more glossy the resulting image. This is because the printer 100 uses more black toner to cover the darker part of the color gamut.

Accordingly, by compressing the color gamut inside the destination profiles more optimal gloss levels may be realized since it has a tendency to reduce the use of black more relative to the CMY toners. More specifically, the printer 100 may be provided with a user-input gloss control that is configured to change the gloss appearance of printed images, by adjusting the parameters of a; black point compensation (BPC) function inside the advanced destination profiles within the printer.

Generally, the BPC function is used for RGB images to retain shadow details in images because many images contain colors that are darker than the darkest color a printer can make. Without black point compensation, detail in these shadow regions may be lost. These details may contain information the viewer knows should be there (such as, for example, the folds of a dark coat, the strands of dark hair, etc). Their absence when printed may be displeasing for a particular user. The BPC function is typically static in the advanced destination profiles within the printer, and not subject to user control.

According to an embodiment, the user-input gloss selection may be correlated to a minimum luminance value, a parameter of the black point compensation function that is used to optimize and/or improve the gloss characteristics of the printer. The black point compensation function maps input luminance values for input image data to the data that will be actually used in rendering images by the printer. This compensation may be performed on a pixel-by-pixel basis.

The printer 100 may accept content for images in any one of a number of possible formats, such as, for example, TIFF, JPEG, or Adobe® PostScript®. This image content is then "interpreted" or "decomposed" in a known manner into a format usable by the marking engine controller.

The input image data may be represented in terms of the constituent process colors according to the color space model (e.g., CYMK, RGB, L*a*b*, etc.). Device dependent color space values, such as RGB and CYMK input image data, may be converted to a device-independent color space, such as CIE-LAB color space, using transformation algorithms or look-up table (LUT), as known in the art, for example, using International Color Consortium (ICC) profiles associated with a printer.

In CIE-LAB (L*, a*, b*) color space L* values correspond to the luminance dimension, and a* and b* correspond to chromatic values, i.e., green-magenta and blue-yellow, respectively. Generally only luminance values have major effect on gloss and thus, the changes to chromatic values are insignificant from gloss compensation perspective and hence may be ignored.

In particular, L* values vary from 0 to 100, where L*=0 indicates the darkest level (i.e., black) and L*=100 indicates the highest luminance level (i.e., white). While CIE-LAB color space is disclosed, it will be appreciated that other device-independent color spaces could also be used, such as, for example, CIE 1976 (L*, u*, v*), CIE XYZ, or LCH.

Luminance values for input image data may then be adjusted using the black point compensation function, and an image corresponding to the input image data may be rendered on a substrate based on the adjusted luminance levels by the printer.

The black point compensation function may be modeled according to a quadratic or parabolic function with x values representing the input L* (input image data) axis and y values representing the output L* (image data to be rendered by the printer) axis, according to equation (1), as follows:

$$y = x_0 + mx + ax^2 \qquad (1)$$

where $x_0 = L^*_{min}$ (i.e., the minimum L* value at which dark colors are to be mapped), and m is the slope of the curve. Taking the derivative with respect to x in equation (1) yields:

$$\frac{dy}{dx} = m + 2ax \qquad (2)$$

A break point $x_c$ may be defined which sets the point (i.e., the maximum input luminance value) where the black point compensation is no longer to be applied.

For example, if the break point $x_c$ is moved to a higher-input luminance value L*, for example, L*=70, then the black point compensation will be applied to colors with L* values from approximately 0 to 70 only. Otherwise, for L* values greater than the break point $x_c$ the output luminance values will be the same as the input luminance values. This is because, as the input luminance values increase, the image requires less toner to render, and no black point compensation is required.

In another implementation, black point compensation may be applied to darker colors, and the break point $x_c$ may be set to a luminance value L*=50. Applying the compensation to lighter colors may de-saturate chromatic colors (e.g., chromatic blue colors can become less chromatic or chromatic red colors can become less red). Of course different break point values are also possible.

For values of $x \geq x_c$ with $x_c$ as the break point, the output may be equal to input, i.e., $$\frac{dy}{dx} = 1.$$

Hence, equation (2) may be written as, $$m + 2ax = 1 \qquad (3)$$

The coefficient, a can then be found at the break point $x_c$ from equation (3) according to equation (4):

$$a = \frac{1-m}{2x_c} \qquad (4)$$

and $$y_c = x_c = x_0 + mx_c + ax_c^2 \qquad (5)$$

Substituting, equation (4) into equation (5) yields:

$$x_c = x_0 + mx_c + \frac{1-m}{2x_c}x_c^2 \qquad (6)$$

Which further reduces to equation (7):

$$x_c = \frac{2x_0}{1-m} \qquad (7)$$

By substituting equation (7) in equation (4), the coefficient, a may be defined in terms of $x_0$ and m as follows:

$$a = \frac{(1-m)^2}{4x_0} \qquad (8)$$

Equations (1) and (8) then may be used to form the BPC function according to equations (9) and (10), below, depending on whether the break point is reached:

$$y = x_0 + mx + \left(\frac{(1-m)^2}{4x_0}\right)x^2: \; x < x_c \quad (9)$$

$$y = x: \; x \geq x_c \quad (10)$$

Accordingly, the BPC curve has been modeled into a function having two inputs parameters; $x_0$ and m, where $x_0 = L^*_{min}$, the value of which all colors with an input value $L^* = 0$ are mapped to, and m as the slope of the parabolic function. In one implementation, for example, only $x_0$ and m are provided as inputs to the BPC function. Equation (7) may be used to compute break point $x_c$. For instance, for $x_0 = 12$ and $m = 0.6$, $x_c = 60$.

The slope m of the function may be determined based on the color space of the input image data (or selected by the user, if desired). In one example, for RGB color space, m may be 0.6, and for CMYK, m may be 0.

The $L^*_{min}$ value is related to gloss based on how much black toner (K) separation is used. For example, in one implementation, $L^*_{min}$ values may range from about 8 to 25.

Figure 3:
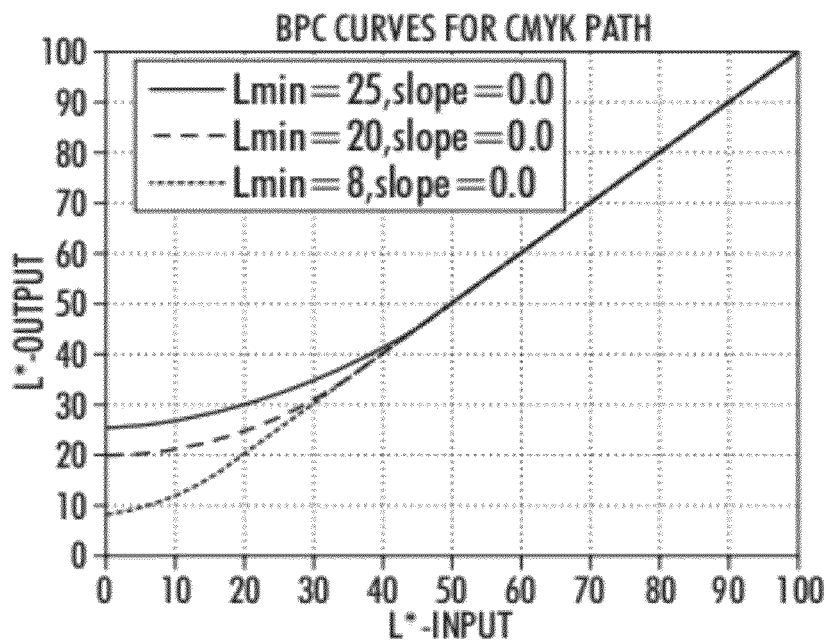
FIG. 3 shows an input L* to output L* map for three different $L^*_{min}$ values at a slope of 0 for the CMYK print path in accordance with an embodiment.

FIG. 3 shows curves for three different values of $L^*_{min}$ where m=0. These $L^*_{min}$ setpoints are considered appropriate for cyan-magenta-yellow-black (CMYK) images. For an input $L^*$ value of 20, the output $L^*$ values are approximately 20, 25 and 29, for $L^*_{min} = 8$, 20 and 25, respectively.

Figure 4:
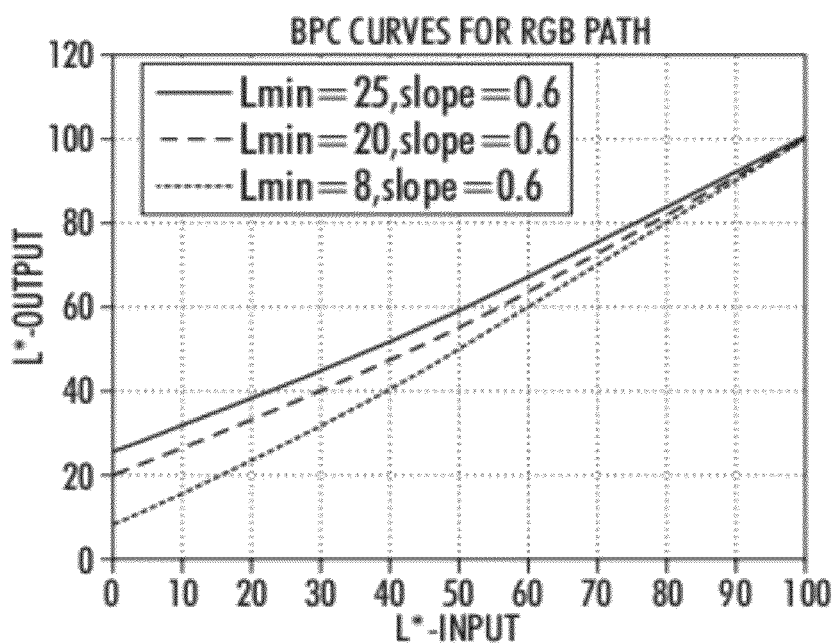
FIG. 4 shows an input L* to output L* map for three different $L^*_{min}$ values at a slope of 0.6 for the RGB print path in accordance with an embodiment.

FIG. 4 shows curves for three different values of $L^*_{min}$ where m=0.6. These setpoints are considered appropriate for red-green-blue (RGB) images. For an input $L^*$ value of 20, the output $L^*$ values are approximately 22, 30 and 38, for $L^*_{min} = 8$, 20 and 25, respectively.

As will be appreciated, when $L_{min} = 25$, the image will have a lower intensity and gloss than when $L^*_{min} = 8$ or 20. This is because the image will be less dark, with less black (K) toner being used, thus lessening the disproportionate contribution of gloss from the black toner. The black point compensation algorithm may be still desirable to preserve details in images with low gloss.

The printer 100 may generate profiles including BPC function curves for use with color management profiles. In one implementation, an electronic memory device may be provided, such as non-volatile memory. The BPC function curve retains the details for dark colors, though at reduced contrast, and at the cost of lightening some of the darkest colors.

Figure 5:
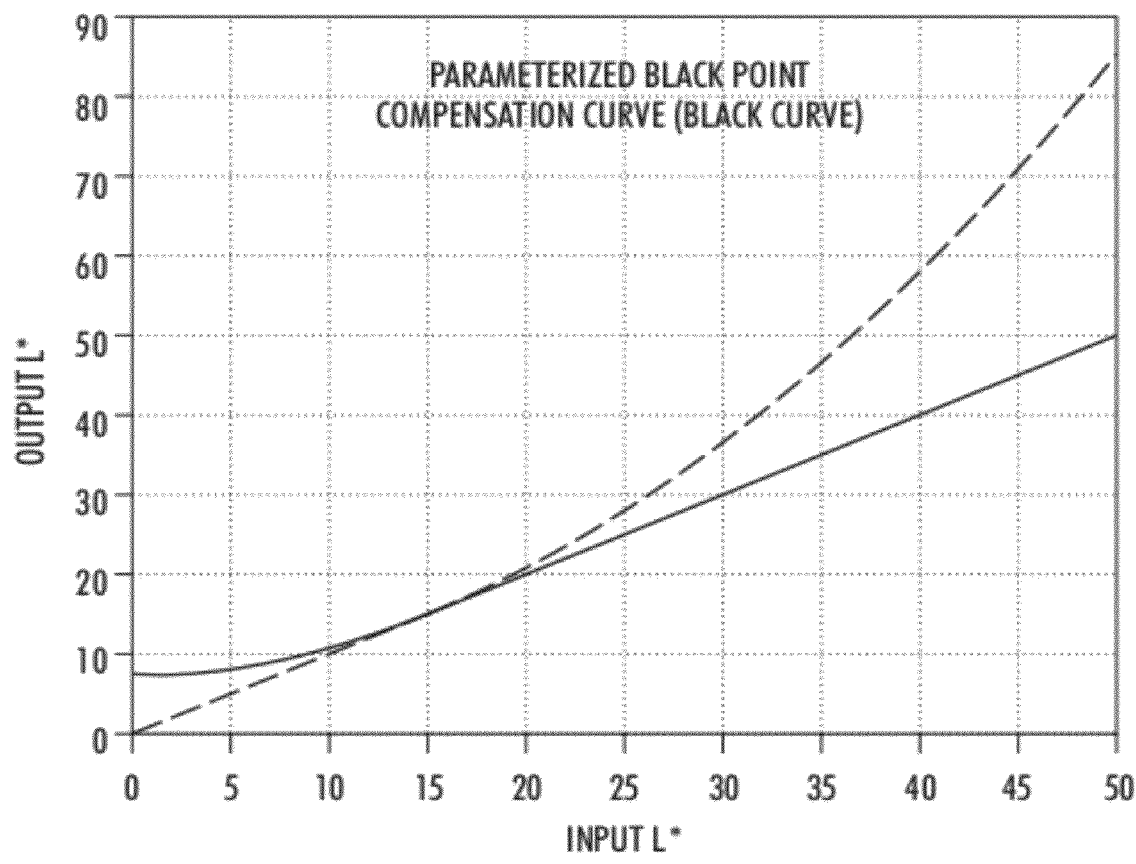
FIG. 5 shows an exemplary parameterized black point compensation curve generated in accordance with an embodiment.

FIG. 5 shows an exemplary parameterized black point compensation curve generated in accordance with an embodiment. The break point occurs at an input $L^*$ of approximately 16, where m=0 and $L^*_{min} = x_0 = 8$. The BPC function, which is shown as a solid line, comprises portions of the parameterized equations (9) and (10). The portions of the plots of parameterized equations (9) and (10) which are not part of the BPC function are shown as broken lines. The break point $x_c$ is where the plots of the two parameterized equations intersect.

According to an embodiment, a user-input gloss selection will be used to determined a value of $L^*_{min}$ to generate the BPC function curve. A user-interface may be provided. For example, the user interface may be presented in display device 120 (FIG. 1) and/or otherwise associated with the printer system 100. In some implementations, the $L^*_{min}$ value may be provided directly by the user.

In others, the $L^*_{min}$ value may be indirectly determined also. In some printers, for example, there may be a default variable $L_{min}$ which represents the darkest color that a particular printer is configured to print. These values generally are fixed by the manufacture, and/or may depend on media types to be printed on.

When dynamic black point compensation is conventionally used, a default value $L_{min}$ may be provided by the printer. For example, the default value $L_{min}$ may be obtained by updating the printer model by printing and measuring color patches. As an alternative approach, the default value $L_{min}$ may be obtained by measuring dark color test patches using an inline/offline spectral sensor and making the measurement available to the printer.

Default $L_{min}$ values may range from about 7-13 for the DC8000, and about 12-15 and for the iGen4®. According to an embodiment, the user may input an offset $\Delta$ with respect to the default $L_{min}$ value of the printer, according to equation (11).

$$L^*_{min} = \text{default } L_{min} + \Delta \quad (11)$$

The $L^*_{min}$ and/or offset $\Delta$ may be obtained from the user via a user interface. In one implementation, the user interface may be a graphical user interface (GUI). The GUI may be located on a printer, or otherwise associated with, such as on a digital front end (DFE). In other implementations, the GUI may be presented to the user remote from the printer.

Different black point compensation profiles may be generated using various $L^*_{min}$ parameters as setpoints. The gamut volume may be extracted for each approach. The LAB gamut volume has been used to characterize the color response of printers.

Table 1 shows LAB gamut volume for various $L^*_{min}$ values. To generate the data in Table 1, multiple test color patches pattern (similar to color patches disclosed in FIG. 7 of U.S. Pat. No. 6,639,669 herein incorporated by reference in its entirety) were printed using a Xerox Corp. DC8000 Digital Press and scanned using an X-Rite Corp. Model DTP41 spectrophotometer to produce an updated printer model. The printer model was then inverted to create an ICC (International Color Consortium) Profile containing the black point compensation algorithm. From the ICC profile, gamut volume for different values of L*min obtained when determined.

TABLE 1

| Examples | Gamut Volume | Volume Relative to Normal (%) | L*min obtained |
|---|---|---|---|
| Normal | 550219 | N/A | 7.4 |
| 1 | 526084 | 95.6 | 14 |
| 2 | 481109 | 91.5 | 18.8 |
| 3 | 399514 | 72.6 | 25.8 |
| 4 | 362131 | 65.8 | 29.1 |
| 5 | 313490 | 57 | 32.9 |
| 6 | 245484 | 44.6 | 38.7 |

The data in Table 1 shows a reduction in gamut volume as the $L^*_{min}$ parameter changes. In particular, as $L^*_{min}$ values increase—signifying a lightening of the image—the gamut volume decreases. When the gamut volume decreases so does the glossiness of the print. This is because less toner mass has been applied to the substrate.

Figure 6:
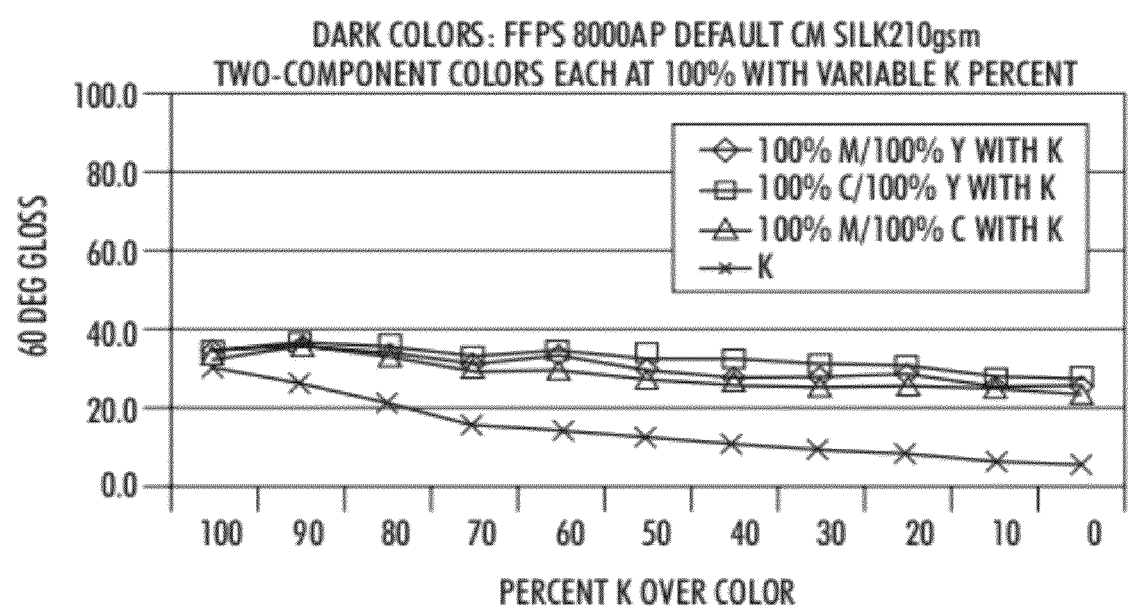
FIG. 6 shows gloss variation with respect to toner area coverage in black (K) and when black toner is mixed with other toner separations after providing gloss compensation with the $L^*_{min}$ value set to 22.

FIG. 6 shows the gloss variation with respect to toner area coverage when black (K) toner is mixed with other CMY toner separation combinations where the $L^*_{min}$ value is set to 22. In particular, the maximum gloss levels, some of which had previously been in excess of 40 gloss (60° gloss), as shown in FIG. 2, are now all below 40 gloss (60° gloss). These test patterns showed a noticeable improvement in gloss over those used to generate the FIG. 2.

Figure 7:
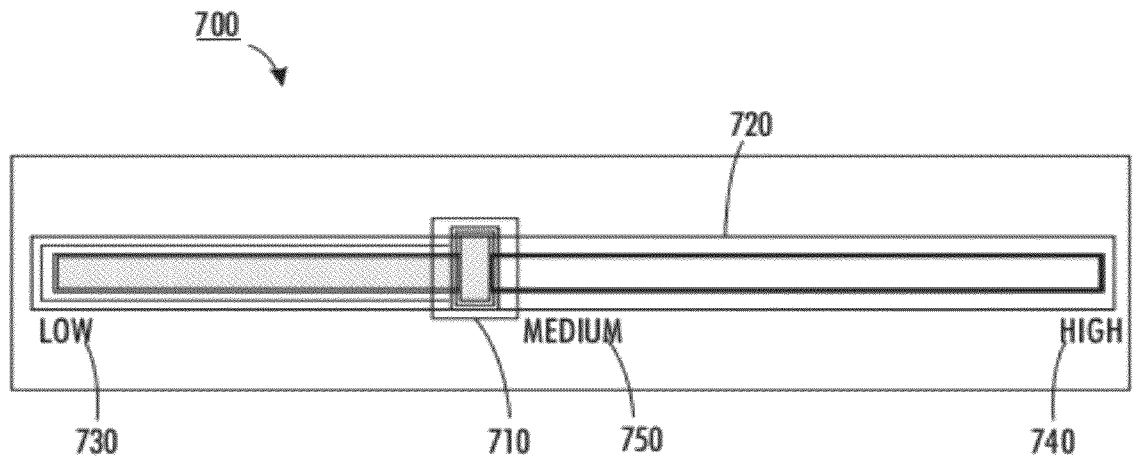
FIG. 7 shows an exemplary slider for gloss control in accordance with an embodiment.

FIG. 7 shows an exemplary slider 700 for gloss control in accordance with an embodiment. Slider 700 generally includes a slide bar 710 which slides along a track 720. Minimum and maximum values 730, 740 may be provided at the distal ends of the track 720 representing the extreme gloss level inputs and, optionally one or more intermediate values 750. In some implementations, graduation marks, a scale, and/or various gloss values might also be provided along the track. The user-input gloss value may be in terms of relative gloss and/or other gloss measurements, such as gloss units (gu). In one implementation, "low," "medium," and "high" relative gloss input references may be provided. In some implementations, as the user manipulates slider bar 710, the current gloss level may be displayed.

The slider 700 may be implemented mechanical or electro-mechanically. For example, the slider bar may include a sliding lever mechanism, which a user can physically move back and forth along the track. A touch-screen display might also be provided which permits the user to virtually move the slider bar across the track, such as in display device 120 (FIG. 1).

Other slider mechanisms might also be used. For example, the slider may include one or more mechanical element, such as, for example, knobs, buttons, levers, switches, toggles, or the like. Alternatively or additional, one or more "virtual" slider mechanisms such as, pop-up or drop-down "windows," touch screens, text-input boxes, or the like may be implemented using a graphical user interface. A joystick, mouse, stylus, trackball, lightpen and/or other input-device might also be used.

In accordance with one or more embodiments, different gloss inputs may be correlated with $L^*_{min}$ values. In some implementations, a look-up-table may be provided. In one implementation, "high gloss," "medium gloss," and "low gloss," may have $L^*_{min}$ setpoints values of 8, 20 and 25 respectively. These $L^*_{min}$ setpoints correspond to gloss values of approximately 0 to 50 gloss units (gu). Of course, gloss values are also dependent on the media type, which is an inherent characteristic thereof. In particular, dull and satin/silk stocks have a glossier, more even finish typically than matte coated stocks, but are not as shiny as gloss stocks.

A gloss versus $L^*_{min}$ function (generally non-linear) could also be provided. For example, empirical data may be utilized to better correlate different user-input gloss values to $L^*_{min}$ values for various types of substrates. A plot, function, curve-fitting technique, or look-up table may be used.

Figure 8:
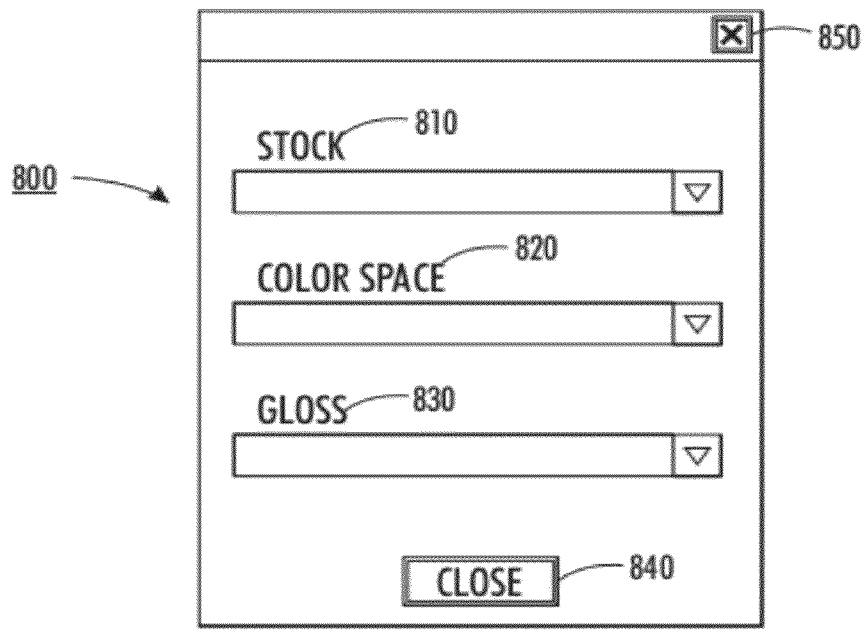
FIG. 8 shows an exemplary user-interface window for gloss control in accordance with an embodiment.

FIG. 8 shows an exemplary user-interface window 800 for gloss control, in accordance with an embodiment. The window 800 may be provided in the display device, 120 (FIG. 1). The window 800 may include one or more parameter controls, such as, for example, stock control 810, color space control 820, and gloss control 830. A close button 840 and/or shortcut button 850 may also be provided for closing the window 800. Controls 810, 820, 830 may include drop-down boxes having various selections for the user to choose. In some implementations, the user may use an input device such as a stylus, mouse, etc., or even a finger, if the display is a touch screen. Stock control 810 may include options to select the printed media type. Color space 820 may include options to select one or more of CMYK, RGB, or other color spaces, as known in the art.

Gloss control 830 option may be used to select gloss levels. In one implementation, as shown in FIG. 8, gloss control 830 may include user-selectable options of "high," "medium," and "low," may be provided which correspond to $L^*_{min}$ setpoints values of 8, 20 and 25 respectively. Other options might also be provided, such as graduation marks, a scale, and/or various gloss values might be provided. The user-input may in terms of relative gloss and/or other gloss measurements, such as gloss units (gu).

Figure 9:
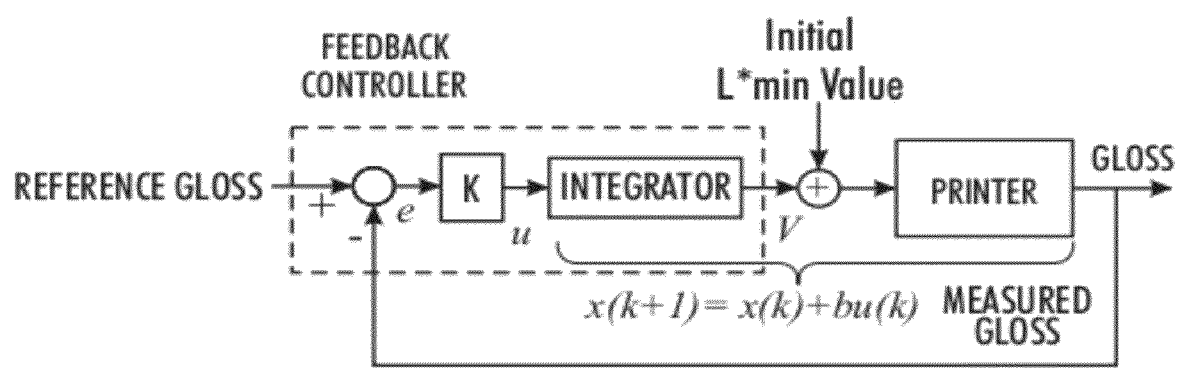
FIG. 9 shows an exemplary feedback gloss controller in accordance with an embodiment.

FIG. 9 shows an exemplary feedback gloss controller 900 in accordance with an embodiment.

Actual gloss may be measured using a gloss sensor and a feedback controller 900 is provided for maintaining a "reference gloss." The gloss sensor may be located in the main document path of the printer and is configured to measure the gloss of the printed test patterns (as well as printed documents, if desired). The reference gloss may be user-inputted, or perhaps a predetermined or default parameter of the printer. For example, the reference gloss may be 40 gloss (60° gloss).

In a calibration mode, one or more test patches may be printed with 100% black and/or with 100% CMYK toner area coverage. The measured gloss is then compared to the reference gloss input to the controller 900 to generate error signal e.

The error signal e is weighted by gain factor K, thus producing gain weighted signal u, which is integrated to yield V that is used for determining the $L^*_{min}$ value, in accordance with the embodiments discussed above. Accordingly, the gloss selection may be adjusted using a transfer function, according to equation (12).

$$x(k+1)=x(k)+b \cdot u(k) \qquad (12)$$

where: x=gloss; and
b=first derivative between gloss (output) to $L^*_{min}$ (input).
The gain matrix may be calculated using b so as to make the feedback loop converge to the desired reference gloss value.

Other transfer functions could also be used. The adjusted gloss selection may then be used to determine the $L^*_{min}$. Accordingly, the reference gloss value may be maintained by the printer.

In other embodiments, the measured gloss value from the gloss sensor may be used as an indicator of actual gloss in the system. For example, the current gloss level (FIG. 7) may be updated accordingly via measurements from the gloss sensor. Knowledge of the actual gloss level may aid the user in selecting a desired gloss level.

Figure 10:
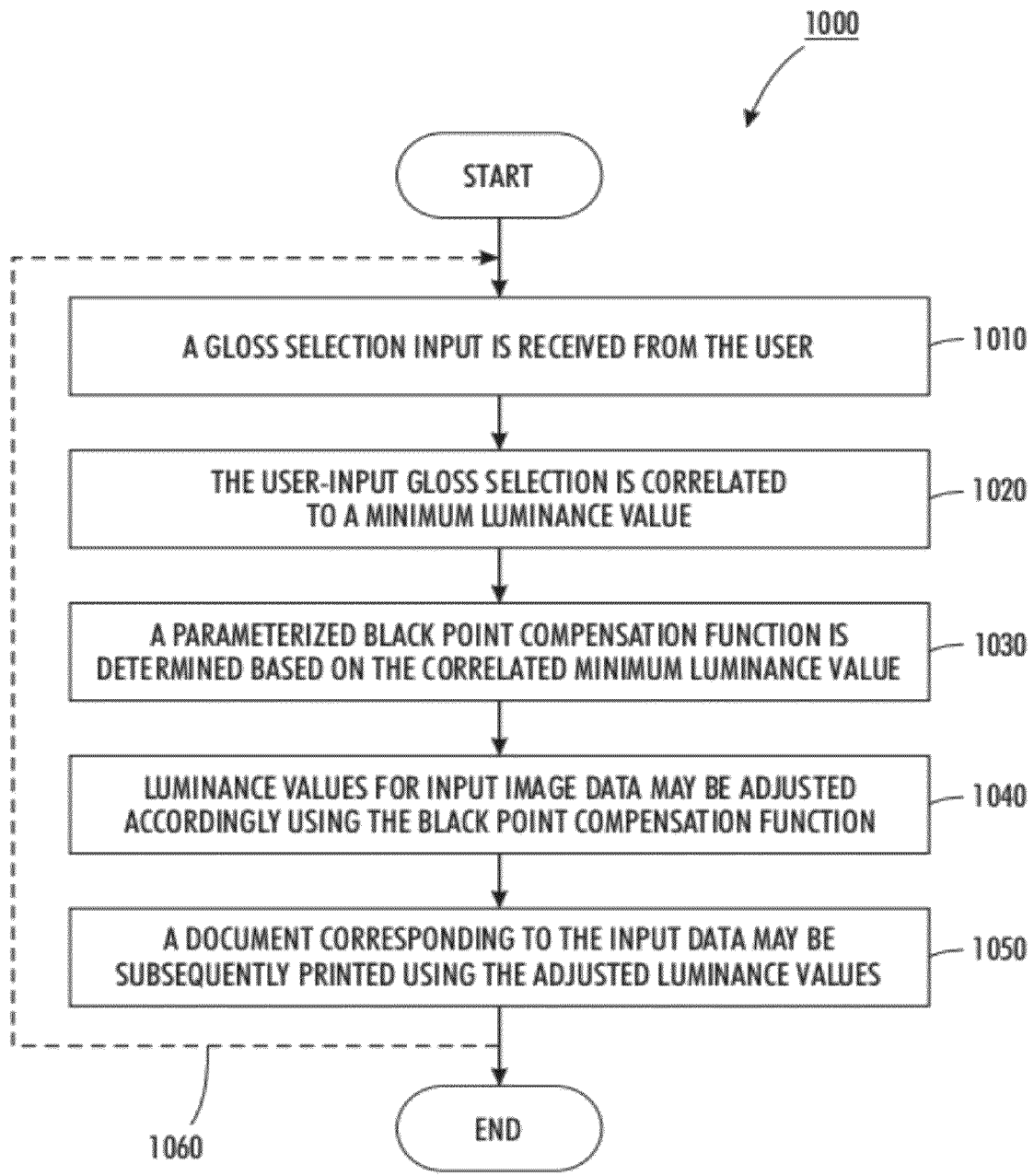
FIG. 10 shows an exemplary method for adjusting the gloss appearance of images using a printer, where a gloss selection is input from a user, in accordance with an embodiment.

FIG. 10 shows an exemplary method 1000 for adjusting the gloss appearance of images using a printer, where a gloss selection is input from a user, in accordance with an embodiment.

In step 1010, the printer receives a gloss selection input from a user. It will be appreciated that in an alternative embodiment, the gloss selection may be obtained from a sensor, for example, a gloss sensor as discussed above. As disclosed herein, a gloss control user interface (see, e.g., FIGS. 7 and 8) may be associated with the printer system 100 that is configured to allow users to adjust the glossy appearance of images. For example, the gloss control user interface may be a slider or a graphical user interface (GUI) which is located on the display device and/or at other locations on the printer 100.

Next, in step 1020, the user-input gloss selection is correlated to a minimum luminance value to be used by the printer. This may include a look-up table, function, empirical data, etc. In some implementations, the type of substrate may also be considered.

Continuing to step 1030, a parameterized black point compensation function is determined based on the correlated minimum luminance value. With the BPC function, in step 1040, luminance values for input image data may be adjusted accordingly using the black point compensation function.

In step 1050, a document may be subsequently printed based on the adjusted luminance levels. The method may then end, or as in step 1060, the method may repeat multiple times, for example, when a user updates or alters a gloss control selection via a user-interface.

A controller may be provided to control the various elements and sequence of operations of the printing system 100 (FIG. 1) in accordance with the various embodiments disclosed herein. In some implementations, the controller may be dedicated hardware like ASICs or FPGAs, software (firmware), or a combination of dedicated hardware and software. For the different applications of the embodiments disclosed herein, the programming and/or configuration may vary. In one embodiment, the controller may be a digital front end (DFE) associated with the printer.

The term "media," as used herein, may include a sheet of paper, such as a standard 8½×11 inch letter paper, A4 paper, or 8½×14 inch legal paper. However, it will be appreciated that "media" may include other sizes and printable media types, such as, bond paper, parchment, cloth, cardboard, plastic, transparencies, film, foil, or other print media substrates. Any reference to paper is not to be construed as limiting. Different grade and/or gloss media may be used.

While this disclosure has been described in connection with what is presently considered to be the most practical and preferred embodiment, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertains, and as may be applied to the essential features hereinbefore set forth and followed in the spirit and scope of the appended claims.

What is claimed is:

1. A method for adjusting gloss appearance of images using a printer, comprising:
   receiving a gloss selection input;
   correlating the input gloss selection to a minimum luminance value to be used by the printer; and
   determining a black point compensation function based on the correlated minimum luminance value;
   adjusting luminance values for input image data using the determined black point compensation function; and
   rendering an image on a substrate based on the adjusted luminance levels.

2. The method according to claim 1, wherein receiving the gloss selection input, comprises:
   receiving a gloss selection input from a user.

3. The method according to claim 2, further comprising:
   providing an user interface for receiving the user-input gloss level.

4. The method according to claim 3, wherein the user interface comprises a slider.

5. The method according to claim 3, wherein the user interface comprises a graphical user interface.

6. The method according to claim 5, wherein the graphical user interface comprises a window.

7. The method according to claim 1, wherein correlating the gloss selection to the minimum luminance value comprises:
   determining the luminance value corresponding to the gloss level in a look-up table.

8. The method according to claim 1, wherein the black point compensation function is defined as $$y = x_0 + mx + \left(\frac{(1-m)^2}{4x_0}\right)x^2 : x < x_c$$

$$y = x : x \geq x_c$$

where:
x is an input luminance value;
y is an output luminance value;
$x_0$ is the minimum luminance value;
m is a slope constant; and
$x_c$ is a function breakpoint.

9. The method according to claim 8, wherein the slope constant m is set to about 0.6 for RGB input image data and the slope constant m is set to about 0 for CYMK input image data.

10. The method according to claim 1, further comprising:
    converting device dependent input image data to a device independent color space.

11. The method according to claim 8, wherein the minimum luminance value $x_0$ is between 8 to 25.

12. The method according to claim 1, wherein correlating the gloss selection to a minimum luminance value to be used by the printer further comprises taking the substrate media into account.

13. The method according to claim 1, wherein receiving the gloss selection input, comprises:
    receiving a gloss selection input from a gloss sensor.

14. The method according to claim 13, further comprising:
    maintaining the adjusted luminance-levels corresponding to the input gloss selection using measured gloss from the gloss sensor.

15. A printer configured to adjust gloss appearance of images comprising:
    a marking engine configured to render an image on a substrate from input image data; and
    a controller configured to: (i) correlate a minimum luminance value to be used by the printer based on a gloss selection; (ii) determine a black point compensation function based on the correlated minimum luminance value; and (iii) adjust luminance values for input image data using the determined black point compensation function.

16. The printer according to claim 15, further comprising:
    an user interface for receiving a user-input gloss selection.

17. The printer according to claim 16, wherein the user interface comprises a slider.

18. The printer according to claim 16, wherein the user interface comprises a graphical user interface.

19. The printer according to claim 18, wherein the graphical user interface comprises a window.

20. The printer according to claim 15, wherein the controller is configured to correlate the gloss selection to the minimum luminance value by determining the luminance value corresponding to the gloss selection in a look-up table.

21. The printer according to claim 15, wherein the black point compensation function is defined as $$y = x_0 + mx + \left(\frac{(1-m)^2}{4x_0}\right)x^2 : x < x_c$$

$$y = x : x \geq x_c$$

where:
x is an input luminance value;

y is an output luminance value;
$x_0$ is the minimum luminance value;
m is a slope constant; and
$x_c$ is a function breakpoint.

22. The printer according to claim 21, wherein the slope constant m is set to about 0.6 for RGB input image data and the slope constant m is set to about 0 for CYMK input image data.

23. The printer according to claim 15, wherein the input image data is device dependent and the controller is configured to convert the device dependent input image data to a device independent color space.

24. The printer according to claim 21, wherein the minimum luminance value $x_0$ is between 8 to 25.

25. The printer according to claim 15, wherein in correlating the gloss selection to a minimum luminance value to be used by the printer, the controller is configured to take the substrate media into account.

26. The printer according to claim 15, further comprising a gloss sensor configured to measure gloss of printed documents.

27. The printer according to claim 26, further comprising a feedback controller configured to maintain the adjusted luminance levels corresponding to the input gloss selection using measured gloss.

* * * * *

UNITED STATES PATENT AND TRADEMARK OFFICE
CERTIFICATE OF CORRECTION

| | |
|---|---|
| PATENT NO. | : 8,154,765 B2 |
| APPLICATION NO. | : 12/421745 |
| DATED | : April 10, 2012 |
| INVENTOR(S) | : Connie Purdum |

It is certified that error appears in the above-identified patent and that said Letters Patent is hereby corrected as shown below:

On title page, item (73) Assignee replace "Xerox Corpoartion"

with -- Xerox Corporation --

Signed and Sealed this
Thirtieth Day of October, 2012

David J. Kappos
*Director of the United States Patent and Trademark Office*